United States Patent [19]

Wardle

[11] Patent Number: 4,806,613

[45] Date of Patent: Feb. 21, 1989

[54] METHOD OF PRODUCING THERMOPLASTIC ELASTOMERS HAVING ALTERNATE CRYSTALLINE STRUCTURE FOR USE AS BINDERS IN HIGH-ENERGY COMPOSITIONS

[75] Inventor: Robert B. Wardle, Logan, Utah

[73] Assignee: Morton Thiokol, Inc., Chicago, Ill.

[21] Appl. No.: 174,665

[22] Filed: Mar. 29, 1988

[51] Int. Cl.$^4$ .............................................. C08G 18/12
[52] U.S. Cl. ........................................ 528/59; 528/65
[58] Field of Search ................................... 528/59, 65

[56] References Cited

U.S. PATENT DOCUMENTS

| | | | |
|---|---|---|---|
| 4,361,526 | 11/1982 | Allen | 264/3 |
| 4,393,199 | 7/1983 | Manser | 528/408 |
| 4,483,978 | 11/1984 | Manser | 528/408 |

OTHER PUBLICATIONS

U.S. patent application Ser. No. 06/925,660, 10/86, Manser et al.

*Primary Examiner*—Maurice J. Welsh
*Attorney, Agent, or Firm*—Wayne E. Nacker; Gerald K. White

[57] ABSTRACT

A method of preparing a thermoplastic elastomer having A blocks and at least one B block, wherein said A blocks are crystalline at temperatures below about 60° C. and said B block(s) is amorphous at temperatures above about −20° C., said A blocks each being polyethers derived from monomers of oxetane and its derivatives and/or tetrahydrofuran and its derivatives, the method comprising providing hydroxyl terminated A blocks which are crystalline at temperatures below about 60° C. and separately providing hydroxyl terminated B blocks which are amorphous at temperatures above about −20° C., end-capping said A blocks and said B blocks by separately reacting each of said A blocks and B blocks with a diisocyanate in which one isocyanate moiety is at least about five times as reactive with the terminal hydroxyl groups of each of the blocks as the other isocyanate moiety, whereby the more reactive isocyanate moiety tends to react with terminal hydroxyl groups of the blocks, leaving the less reactive isocyanate moiety free and unreacted, mixing said end-capped A blocks and said end-capped B blocks together at approximately the stoichiometric ratios that they are intended to be present in the thermoplastic elastomer, and reacting said mixture with a linking compound having two isocyanate-reactive groups which are sufficiently unhindered to react with the free isocyanate groups of said end-capped polymer.

16 Claims, No Drawings

METHOD OF PRODUCING THERMOPLASTIC ELASTOMERS HAVING ALTERNATE CRYSTALLINE STRUCTURE FOR USE AS BINDERS IN HIGH-ENERGY COMPOSITIONS

The U.S. Government has rights in this invention pursuant to Contract No. DAAA15-85-C-0037 awarded by the U.S. Army.

The present invention relates to a novel method for producing thermoplastic polymers which are useful as binders in high-energy compositions, such as propellants, explosives, gasifiers, or the like.

BACKGROUND OF THE INVENTION

Solid high-energy compositions, such as propellants, explosives, gasifiers, or the like, comprise solid particulates, such as fuel particulates and/or oxidizer particulates, dispersed and immobilized throughout a binder matrix comprising an elastomeric polymer.

Conventional solid composite propellant binders utilize cross-linked elastomers in which prepolymers are cross-linked by chemical curing agents. As outlined in detail in U.S. Pat. No. 4,361,526, there are important disadvantages to using cross-linked elastomers as binders. Cross-linked elastomers must be cast within a short period of time after addition of the curative, which time period is known as the "pot life". Disposal of a cast, cross-liked propellant composition is difficult, except by burning, which poses environmental problems. Furthermore, current state-of-the-art propellant compositions have serious problems that include, but are not limited to: use of nonenergetic binders, high end-of-mix viscosities, thermally labile urethane linkages, and extreme vulnerability to unscheduled detonation.

Cross-linked elastomers in which prepolymers are polyethers derived from oxetane derivatives and tetrahydrofuran (THF) are described in U.S. Pat. No. 4,483,978, issued to Manser. Urethane curing is achieved with isocyanates and additional cross-linking agents.

In view of inherent disadvantages of cross-linked elastomeric polymers as binder materials, there has been considerable interest in developing thermoplastic elastomers suitable as binders for solid, high-energy compositions. However, many thermoplastic elastomers fail to meet various requirements for propellant formulations, particularly the requirement of being processible below about 120° C., it being desirable that a thermoplastic elastomeric polymer for use as a binder in a high-energy system have a melting temperature of between about 60° and about 120° C. The lower end of this range relates to the fact that the propellant composition may be subject to somewhat elevated temperatures during storage and use, and it is undesirable that significant softening of the propellant composition occur. The upper end of this range is determined by the instability, at elevated temperatures, of many components which ordinarily go into propellant compositions, particularly oxidizer particulates and energetic plasticizers. Many thermoplastic elastomers exhibit high melt viscosities which preclude high solids loading and many show considerable creep and/or shrinkage after processing. Thermoplastic elastomers (TPE's) typically obtain their thermoplastic properties from segments that form glassy domains which may contribute to physical properties adverse to their use as binders. Thermoplastic elastomers are block copolymers with the property of forming physical cross-links at predetermined temperatures. The classical TPE, e.g., Kraton, obtains this property by having the glass transition point of one component block above room temperature. At temperatures below 109° C., the glassy blocks of Kraton form glassy domains and thus physically cross-link the amorphous segments. The strength of these elastomers depends upon the degree of phase separation. Thus, it remains desirable to have controlled, but significant, immiscibility between the two types of blocks, which is a function of their chemical structure and molecular weight. On the other hand, as the blocks become more immiscible, the melt viscosity increases, thus having a deleterious effect on the processibility of the material. Above-mentioned U.S. Pat. No. 4,361,526 proposes a thermoplastic elastomeric binder which is a block copolymer of a diene and styrene, the styrene blocks providing a meltable crystal structure and the diene blocks imparting rubbery or elastomeric properties to the copolymer. This polymer requires processing with a solvent; solvent processing is undesirable in that the propellant cannot be cast in a conventional manner, e.g., into a rocket motor casing. Furthermore, solvent-based processing presents problems with respect to removal and recovery of solvent.

It has been proposed to produce themoplastic elastomers having both (A) and (B) blocks, each derived from cyclic ethers, such as oxetane and oxetane derivatives and tetrahydrofuran (THF) and tetrahydrofuran derivatives. The monomer or combination of monomers of the (A) blocks are selected for providing a crystalline structure at usual ambient temperatures, whereas the monomer or combination of monomers of the (B) blocks are selected to ensure an amorphous structure at usual ambient temperatures. Such proposed thermoplastic elastomers (TPE's) include ABA triblock polymers, $(AB)_n$ polymers in which A and B blocks alternate and $A_nB$ star polymers in which several A blocks are linked to a central, multi-functional B block. Such TPE's are thought to be highly suitable for use in binder systems for high-energy compositions, such as propellants, explosives, gasifiers, or the like. The A and B blocks of such polymers are mutually miscible in a melt of the polymer. The melt viscosities of such a TPE decreases rapidly as the temperature is raised above the melting point of the crystalline (A) blocks, contributing to its processability. Furthermore, a thermoplastic elastomer based upon crystalline domains exhibits advantageous solvent-resistance and minimal setup shrinkage. Such a TPE can be formulated to have a melting temperature which falls within a desirable 60° C. to 120° C. range, to be chemically stable up to 120° C. and above, to have a low melt viscosity, to be compatible with existing components of high-energy compositions, to retain mechanical integrity when filled with solids up to 90 percent w/w, and to have a glass transition temperature below −20° C. and even below −40° C.

Two methods have been previously proposed for producing such TPE's. According to one proposed method, ABA triblock or $(AB)_n$ polymers may be joined together through a block linking technique in which a linking moiety, such as phosgene or a isocyanate, is reacted with both ends of the middle (B) block and the end (A) blocks are subsequently reacted with the linking group (x). Generally the reaction is:

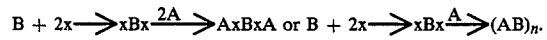

According to the other proposed method, an ABA polymer is formed by systematic monomer addition. For example, the A monomer may be reacted with an initiating adduct to form an A block by cationic polymerization and the reaction allowed to proceed until monomer A is substantially exhausted. Then the monomer or monomers of block B are added and polymerization proceeds from the active end of block A. When the monomers of block B are substantially exhausted, additional monomers of block A are added, and polymerization proceeds from the active end of block B. The reaction is represented by the equation:

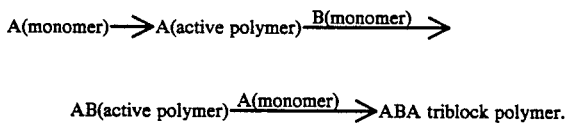

Alternatively, a difunctional initiator could be used to initiate the polymerization of the B block. When the A block is added, the polymerization would proceed from both active ends of the B block. The reaction is represented by the equation:

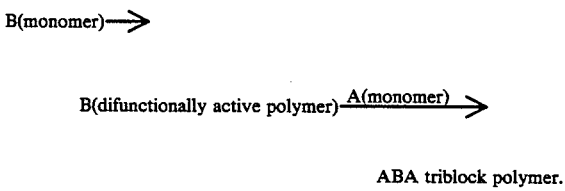

ABA triblock polymer.

By selection of appropriate block functionality or by repetition of steps, these methods are also proposed as being suitable for producing $(AB)_n$ polymers and $A_nB$ star polymers.

Both of these methods of producing polyether TPE's have proven less than unsatisfactory. Joining of A and B blocks is found to be minimal at best by either of the two methods described above; accordingly, an improved process for producing TPE's having both crystalline A polyether blocks and amorphous B polyether blocks is desired.

SUMMARY OF THE INVENTION

In accordance with the present invention, a novel method is provided for forming themoplastic elastomers having polyether crystalline (A) blocks and polyether amorphous (B) blocks. Each of the polyether blocks ((A) and (B)) are individually synthesized. The (A) blocks and (B) blocks are each separately end-capped with a diisocyanate in which one isocyanate moiety is substantially more reactive with active groups on the blocks than is the other isocyanate moiety. Finally, the end-capped blocks are mixed and reacted with a difunctional linking chemical in which each function on the linking chemical is isocyanate-reactive and sufficiently unhindered to react with a free isocyanate moiety on a capped block.

DETAILED DESCRIPTION OF CERTAIN PREFERRED EMBODIMENTS

The method of the present invention is directed to producing thermoplastic elastomeric $(AB)_n$ polymers, in which at least one B block is flanked by at least one pair of A blocks. The A blocks are crystalline at temperatures below about 60° C. and preferably at temperatures below about 75° C.; the B blocks are amorphous at temperatures down to about −20° C. and preferably down to about −40° C. Each of the A and B blocks are polyethers derived from cyclic ethers, including oxetane and oxetane derivatives and THF and THF derivatives. The polymers melt at temperatures between about 60° C. and about 120° C. and preferably between about 75° C. and about 100° C. The A and B blocks are mutually miscible in the melt; consequently, the melt viscosity of the block polymer decreases rapidly as the temperature is raised above the melting point, whereby high energy formulations may include high solids content, e.g., up to about 90% by weight of solid particulates, and be easily processed. The invention also includes other TPE block polymers, such as ABA triblock polymers and $A_nB$ star polymers. Contributing to the miscibility of the A and B blocks is their similar chemical structure. Oxetane and tetrahydrofuran (THF) monomer units used in forming the blocks of the present invention have the general formulae:

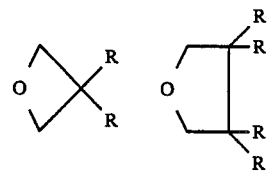

wherein the R groups are the same or different and are selected from moieties having the general formulae: —$(CH_2)_nX$, where n is 0–10 and X is selected from the group consisting of —H, —$NO_2$, —CN, —Cl, F, —O-alkyl, —OH, —I, —$ONO_2$, —N($NO_2$)-alkyl, —C≡CH, —Br, —CH═CH(H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and $N_3$.

Examples of oxetanes used in forming block polymers in accordance with the invention include but are not limited to:
BEMO 3,3-bis(ethoxymethyl)oxetane,
BCMO 3,3-bis(chloromethyl)oxetane,
BMMO 3,3-bis(methoxymethyl)oxetane,
BFMO 3,3-bis(fluoromethyl)oxetane,
HMMO 3-hydroxymethyl-3-methyloxetane,
BAOMO 3,3-bis(acetoxymethyl)oxetane,
BHMO 3,3-bis(hydroxymethyl)oxetane,
OMMO 3-octoxymethyl-3-methyloxetane,
BMEMO 3,3-bis(methoxyethoxymethyl)oxetane,
CMMO 3-chloromethyl-3-methyloxetane,
AMMO 3-azidomethyl-3-methyloxetane,
BIMO 3-3-bis(iodomethyl)oxetane,
IMMO 3-iodomethyl-3-methyloxetane,
PMMO 3-propynomethylmethyloxetane,
BNMO 3,3-bis(nitratomethyl)oxetane,
NMMO 3-nitratomethyl-3-methyloxetane,
BMNAMO 3,3-bis(methylnitraminomethyl)oxetane,
MNAMMO 3-methylnitraminomethyl-3-methyloxetane, and
BAMO 3,3-bis(azidomethyl)oxetane.

Forming TPE's in accordance with the invention requires (1) formation of a polymer, which is to serve as the A blocks, that is crystalline in nature with a relatively elevated melting point, i.e., between about 60° C. and about 120° C., preferably near 80° C. and (2) formation of a polymer, which is to serve as the B block(s), that is amorphous in structure having a glass transition temperature ($T_g$) below about $-20°$ C. and preferably below about $-40°$ C.

Examples of suitable crystalline A blocks include polyBEMO, polyBMMO and polyBFMO. Both polyBEMO and polyBMMO melt at between 80° C. and 90° C., and polyBFMO has a melting point of about 105° C. These crystalline homopolymers may be selected as A blocks according to the particular binder requirements. For example polyBMMO has a higher ether oxygen content than polyBEMO, which may be advantageous in particular applications. Although the 80° C. to 90° C. melting point of polyBMMO and polyBEMO are generally preferred, the higher melting temperature of polyBFMO may be preferred in particular binder applications. Also polyBFMO has a higher density than either polyBEMO or polyBMMO which may suit particular binder applications.

The advantage of a crystalline hand block is shown in the dynamic mechanical property Table below.

| RDS DATA | | | |
|---|---|---|---|
| | Temp (C.) | G' | G" |
| 1 | 25 | 363400000 | 52500000 |
| 2 | 30 | 318600000 | 47900000 |
| 3 | 35 | 277200000 | 43300000 |
| 4 | 40 | 233000000 | 38000000 |
| 5 | 45 | 181700000 | 31300000 |
| 6 | 50 | 133800000 | 24300000 |
| 7 | 54 | 107500000 | 20400000 |
| 8 | 56 | 97400000 | 18700000 |
| 9 | 58 | 87100000 | 17000000 |
| 10 | 60 | 76800000 | 15200000 |
| 11 | 62 | 66500000 | 13400000 |
| 12 | 64 | 57300000 | 11800000 |
| 13 | 66 | 46700000 | 9800000 |
| 14 | 68 | 36500000 | 7800000 |
| 15 | 70 | 26400000 | 5700000 |
| 16 | 72 | 16000000 | 3560000 |
| 17 | 74 | 6200000 | 1440000 |
| 18 | 76 | 400000 | 160000 |

G' = Storage Modulus
G" = Loss Modulus

This Table shows that a TPE containing a crystalline block maintains good mechanical properties to within a very few degrees of the melting point. At the melting point, the material softens and flows with a relatively low viscosity.

The soft or amorphous B block is selected from homopolymers and copolymers (or higher number mixed polymers) found to have low glass transition temperatures. An important class of amorphous blocks in accordance with the invention are copolymers of THF and simple oxetane monomers, including those monomers which form the crystalline homopolymers described above. For example, THF/BEMO, THF/BMMO and THF/BFMO copolymers have been found to be amorphous at ambient temperatures, having low glass transition temperatures. The physical characteristics of these copolymer blocks depend upon the relative proportions of THF and the oxetane monomer, the molar ratios ranging from between 20 and about 80 percent THF monomers.

Oxetanes having long or bulky side chains may be copolymerized with THF to provide B blocks which are "internally plasticized". That is, the side chains (R) sterically hinder close packing of polymer chains, contributing to low viscosity and low $T_g$ of the copolymer. Two oxetane monomers which provide internal plasticization in a THF/oxetane copolymer are OMMO and BMEMO. Again, the THF:oxetane molar ratio ranges from about 80:20 to about 20:80.

In addition, homopolymers and copolymers of various energetic oxetanes exhibit amorphous characteristics. B blocks formed with energetic polymers are useful in forming energetic thermoplastic elastomers. High energy polymers and copolymers include, but are not limited to, polyNMMO, polyBAMO/AMMO, polyBAMO/NMMO and polyAMMO, the monomers used to form the copolymers being used throughout the entire spectrum of molar ratios, depending upon the physical and energetic characteristics required of the B block. In using the energetic homopolymer or copolymer B blocks to form $(AB)_n$ block polymers, it may be preferred to use non-energetic A blocks, such as the polyBEMO, polyBMMO and polyBFMO blocks, described above, in order to ensure low vulnerability of the high-energy composition formed therefrom. However, where higher energy binders are desired or required, it is considered to be within the scope of the present invention to have A blocks similarly formed with high-energy monomers. An example would be polyBAMO.

The properties of the block polymer depends upon the molecular weights of the individual blocks and the total molecular weights. Typically the A blocks have molecular weights ranging from about 3000 to about 12,500 whereas the B blocks have molecular weights ranging from about 5000 to about 50,000. Preferably, the A blocks are shorter than the B blocks, the total molecular weights of the A blocks typically ranging from about 1/5 to 1 times the molecular weight of the B block in a triblock polymer or the total molecular weight of B blocks in an $(AB)_n$ or $A_nB$ star polymer. Typically, the A blocks will have generally similar size. The preferred sizes of the A and B blocks for any particular binder application must be emperically determined.

Thermoplastic elastomers produced in accordance with the present invention are admixed with other components of a high-energy formulation, such as a propellant formulation. The binder system, in addition to the TPE, may optionally contain a plasticizer at a plasticizer-to-TPE ratio of up to about 2.5:1, suitable high-energy plasticizers including nitroglycerine, butanetriol trinitrate (BTTN), and trimethylolethane trinitrate (TMETN). If the block TPE is internally plasticized, e.g., with OMMO or BEMO as described above, there is less need for external plasticizers, although high-energy nitroester plasticizers may be used to enhance the energy value of the binder system as a whole. The binder system may also contain a minor amount of a wetting agent or lubricant that enables higher solids loading.

The solids content of the high-energy composition generally ranges from about 50 wt. percent to about 90 wt. percent, higher solids loading generally being preferred so long as this is consistent with structural integrity. The solids include fuel material particulates, such as particulate aluminum, and/or oxidizer particulates, such as ammonium perchlorate, cyclotetramethylene tetranitramine (HMX) and cyclotrimethylene trinitramine (RDX). In addition, the high-energy composition may include minor amounts of additional components known in the art, such as bonding agents, burn rate modifiers, etc.

The thermoplastic elastomer may be mixed with the solids and other components of high-energy formulation at temperatures above its melting temperature.

Blending is done in conventional mixing apparatus. Because of the low viscosities of the molten polymer, no solvents are required for blending or other processing, such as extrusion. An advantage of using thermoplastic elastomers for binders is mixing, although from an energy efficiency standpoint, this is generally desirable.

An important advantage of having a propellant which is meltable is that the propellant from an outdated missile can be melted down and reused. At the time of such remelting, the propellant might be reformulated, e.g., by addition of additional fuel or oxidizer particulates. Accordingly, the thermoplastic elastomer of the propellant composition provides for its eventual recycle, as opposed to the burning required for disposal of cross-linked propellant compositions. Because the thermoplastic propellant does not have a "pot life", there is no limitation to the time of casting, and if any problems develop during casting, the process can be delayed as long as necessary, merely by maintaining the propellant formulation in molten form.

The monomer blocks may be formed according to the cationic polymerization technique taught by Manser in U.S. Pat. No. 4,393,199. The technique employs an adduct of a substance such as a diol, e.g., 1,4-butane diol. (BDO), and a catalyst for cationic polymerization, e.g., BF$_3$-etherate. This adduct forms with the monomer (oxetane or THF) an initiating species which undergoes chain extension until n moles of monomer have been incorporated in the molecule, n being the ratio of monomers to adduct present. By adjusting the ratio of monomers to adduct present, the polymer molecular weight of the polymer which forms may be adjusted. If two monomers are present, e.g., an oxetane plus THF or two oxetanes, incorporation of the monomers will be generally random but may depend upon the relative reactivities of the monomers in the polymerization reaction.

In accordance with the novel method of the invention, thermoplastic elastomers are produced which contain both crystalline polyether (A) blocks and amorphous polyether (B) blocks with at least one pair of (A) blocks flanking at least one (B) block. The (A) blocks and (B) blocks are each synthesized separately and are each separately end-capped with a diisocyanate. The diisocyanate has one isocyanate moiety which is substantially more reactive with the terminal functional groups on the blocks than is the other isocyanate moiety. Subsequently, the end-capped (A) and (B) blocks are mixed together and joined by a small linking compound which has a pair of isocyanate-reactive functions that are sufficiently unhindered to allow them to react with the free isocyanate moieties of the end-capped copolymers and thereby join the blocks together.

Oxetane and THF/oxetane polymer blocks, synthesized as described above, have terminal hydroxyl functions which are reacted with the end-capping diisocyanates in accordance with the invention. An important aspect of the invention is that the end-capping compound have two isocyanate moieties and that one of the isocyanate moieties be substantially more reactive with the terminal hydroxyl moieties of the polymer blocks than the other isocyanate moiety. One of the problems with linking these types of polymer blocks is that oxetane derived hydroxyl end groups units have neopentyl structures, whereby the terminal hydroxyl moieties are substantially hindered. The diisocyanate is selected so that one of the isocyanate groups reacts with a terminal hydroxyl group of a polymer block while the other isocyanate moiety remains free and unreacted. Diisocyanates are used because isocyanates of higher functionality would result in undesirable cross-linking. The different reactivities of the isocyanate moieties is necessary to ensure that substantial chain extension through linking of like blocks does not occur. Thus, for purposes of this invention, one isocyanate moiety of the diisocyanate should be approximately five time more reactive with terminal hydroxyl groups of oxetane and THF/oxetane blocks than the other group. Preferably one isocyanate moiety is at least about ten times more reactive than the other.

One diisocyanate which is especially useful for purposes of the invention is 2,4 toluene diisocyanate (TDI) in which the isocyanate moiety in the 4 position is substantially more reactive with hindered terminal hydroxyl moieties than the isocyanate moiety in the 2 position. Isophorone diisocyanate (IPDI) is suitable for some applications, though less so than TDI. Examples of diisocyanates which have not worked well include diphenylmethylene diisocyanate (MDI) and hexamethylene diisocyanate (HDI).

In the end-capping reaction, the diisocyanate is used at approximately a stoichiometric molar amount relative to terminal hydroxyl groups on the polymer chain. Thus, if the polymer chain has a pair of terminal hydroxyl groups, approximately two molar equivalents, e.g., 1.75-2.2 molar equivalents of diisocyanate are used. In the ideal reaction, all of the more reactive isocyanate moieties would react with terminal hydroxyl groups, leaving all of the less reactive isocyanate moieties free. Actually, not all of the diisocyanate reacts, and some chain extension does occur. Thus, the end-capping reaction may be maximized for particular polymer chains by some adjustment in the relative molar ratios of polymer block and diisocyanate.

Because the A blocks and B blocks are reacted separately with the diisocyanate, there is no competition of the blocks for diisocyanate molecules, and each separate end-capping reaction may be carried to substantial completion. The diisocyanate may react more rapidly with one block than the other, but this difference can be compensated for by a longer reaction time with the slower reacting block. Differential reaction rates of terminal hydroxyl groups on different blocks may be partially responsible for less-than-successful results when attempting to directly link (A) and (B) blocks, e.g., with diisocyanates or phosgenes. The reactivity of the terminal hydroxyl groups varies according to steric factors and also according to side-chain moieties. Energetic oxetanes, for example, generally have side-chain moieties that are electron-withdrawing, making their terminal hydroxyl groups less reactive. Once end-capped with diisocyanate, the reactivities of the polymers for linking purposes is essentially dependent only upon the reactivity of the free isocyanate—not on the chemical makeup of the polymer chain itself. Thus end-capped (A) blocks are substantially as reactive as end-capped (B) blocks.

The end-capping reaction is carried out in a suitable solvent, e.g., one which dissolves the polymer and does not react with the free isocyanate moieties. The reaction is promoted by a suitable urethane catalyst. Lewis acid catalysts and protic acid catalysts are generally suitable. A preferred class of catalysts are organic tin compounds with at least one and preferably two labile groups, such as chloride or acetate, bound directly to the tin. One suitable tin catalyst is diphenyl tin dichloride.

The linking compound is one which has two functional groups which react with isocyanate moieties in a urethane reaction and are sufficiently unhindered so as to react with the free isocyanate moieties on the end-capped blocks. Preferred functional groups are hydroxyl groups, although amine, amide, and carboxyl groups also react in a urethane reaction. Primary functional groups are preferred. Typically, the linking compound will be a short, straight carbon chain having terminal hydroxyl groups, e.g., 1,4 butanediol, ethylene glycol, and 1,6 hexanediol. It is to be appreciated that a wide variety of difunctional compounds could be used for linking the end-capped blocks. Although there is no limit to the size of the linking compound, it is generally preferred that the linking compound be of relatively low molecular weight so as to minimally influence the characteristics of the block polymer.

As in the end-capping reaction, some solvent is preferably used, as is a catalyst, such as described above. Conveniently, the reaction mixtures of the (A) blocks and (B) blocks may be mixed together without prior separation of the blocks from their respective end-capping reaction mixtures. The linking compound is added directly to this mixture of (A) and (B) blocks. The catalyst is thereby already present when the linking compound is added.

The linking compound is added in an amount such that the total number of linking-compound functional groups approximately equals the total number of free isocyanate groups of the end-capped polymer blocks. Thus, to provide an $(AB)_n$ polymer with multiple blocks of each chain, the linking compound to polymer block molar ratio is in the range of 0.5, e.g., 0.4–0.6. To form an ABA triblock polymer, (A) block, (B) block, and linking compound are provided at an approximate 2:1:2 molar ratio. Of course, all linkages do not go as intended; thus, in forming an ABA triblock polymer, some (B) block chain extension will occur. Accordingly, optimal molar ratios of blocks and linking chemicals may have to be empirically determined.

In each of the end-capping step and in the block linking step, the reaction can be followed with NMR and IR. With NMR, the urethane-forming reaction can be followed through the methylene groups on the polymer adjacent to the terminal hydroxyl groups. With IR, the change from isocyanate to urethane can be directly followed.

Synthesis of BAMO and AMMO are described in above-identified U.S. Pat. No. 4,483,978, the teachings of which are incorporated herein by reference.

The invention will now be described in greater detail by way of specific examples.

EXAMPLE 1

3,3-Bis(ethoxymethyl)oxetane (BEMO)

In a 12 liter, five-neck flask, fitted with a stirrer, reflux condenser, and dry nitrogen inlet tube, 8000 ml of absolute ethanol followed by 717.6 g (31.2 mole) of sodium metal were placed. The temperature was maintained at mild reflux by the use of a cold water bath until all of the sodium had dissolved. To the reaction mixture was then added 1200 g (7.7 mole) of 3,3-bis(chloromethyl)oxetane, and the resultant mixture was heated to mild reflux for 24 hr. After cooling to room temperature, the reaction products were quenched in 5000 ml of distilled water and then extracted with four portions of 500 ml of methylene chloride. The combined extracts were then dried over magnesium sulfate and the solvent was removed by evaporation. Pure monomer was obtained by distillation, the main fraction being collected at 54° C. and 1.6-mm Hg pressure. 1284 g of polymerizable grade monomer were obtained by redistillation from calcium hydride, representing a 95% yield.

EXAMPLE 2

3,3-Bis(methoxymethyl)oxetane (BMMO)

Into a 12 liter, five-neck flask, fitted with a stirrer, reflux condenser, and dry nitrogen inlet tube, 4200 ml of anhydrous methanol followed by 552 g (24 mole) of sodium metal were placed. The temperature was maintained at mild reflux by the use of a cold water bath until all of the sodium had dissolved. To the reactor was then added 1240 g (8 mole) of 3,3-bis(chloromethyl)oxetane, and the resultant mixture was heated to mild reflux for 48 hr. After cooling to room temperature, the reaction products were quenched in 6,000 ml of distilled water, and were then extracted with four portions of 500 ml methylene chloride. The combined extracts were then dried over magnesium sulfate and the solvent was removed by evaporation. Pure monomer was obtained by distillation, the fraction boiling at 45° C. at 0.3-mm Hg pressure being collected. 1052 g of polymerizable grade monomer was obtained by redistillation from calcium hydride, representing a 90% yield.

EXAMPLE 3

3,3-Bis(fluoromethyl)oxetane (BFMO)

Into a 5 liter, three-neck flask, fitted with a stirrer and reflux condenser, 1000 g (17.2 mole) of potassium fluoride suspended in 2000 ml of anhydrous ethylene glycol were added. To this mixture was then added 1000 g (6.45 mole) 3,3-bis(chloromethyl)oxetene, and the pot temperature was raised slowly to 180° C. After 1 hr at this temperature, the condenser was replaced with a 12-in. vigreaux column and the pot temperature was raised to 190° C. The product was then collected, as formed, from the reactor. After 5 hr, 625 g of material was collected, and redistillation at a boiling point of 49° C. at 155-mm pressure, through a Snyder (floating ball) column, yielded 488 g of product, representing a 62% yield.

EXAMPLE 4

3,3-Bis(methoxyethoxymethyl)oxetane (BMEMO)

To a 5 liter, three-neck flask, fitted with a reflux condenser, a stirrer and a thermometer, were added 1824 g (24 mole) of 2-methoxyethanol followed by 139 g (6 mole) of sodium metal. The flask temperature was then raised to mild reflux and thus maintained until all the sodium had dissolved. At this time, 465 g (3 mole) of 3,3-bis(chloromethyl)oxetane was added and heating was maintained for a further 24 hr. The mixture was then cooled to room temperature and the precipitated sodium chloride was removed by filtration. The filtrate was dissolved in an excess offwater, extracted with four portions of 500 ml methylene chloride, and then the combined organic layers were dried over magnesium sulfate. The solvent was then removed by evaporation and the required monomer isolated by fractional distillation, the fraction boiling at 85° C. and 0.1-mm pressure being collected. Redistillation from calcium hydride yielded 487 g of polymerizable grade monomer.

Elemental analysis calculated: C, 56.4; H, 9.4. Found: C, 56.1, H, 9.8.

NMR(CDCL₃): $\delta 3.36(s,CH_3)$; $3.57(d,OCH_2CH_2O)$ J=3; $3.69(s,CH_2O)$; $4.45(s,CH_2OCH_2)$.

EXAMPLE 5

3-Chloromethyl-3-methyloxetane (CMMO)

In a 5 liter, three-neck flask, fitted with a stirrer, condenser, and thermometer, were placed 2000 ml of carbon tetrachloride. The flask was heated to reflux, and then 100 ml of solvent was allowed to distill off and remove any residual water. The flask was cooled to room temperature, and to it was added 957 g (3.66 mole) of triphenylphosphine and 372 g (3.66 mole) of 3-hydroxymethyl-3-methyloxetane. The mixture was heated with caution to 65° C., at which point a strong exotherm occurs and the reaction becomes self-sustaining. This exothermic reaction continued for 1 hr, at which time external heating was reapplied for an additional 1 hr. The flask was then cooled to room temperature and the resultant precipitate was removed by filtration. The filtrate was then dissolved in ether, washed with distilled water, dried over magnesium sulfate, and then evaporated to remove the solvents. Distillation through a Snyder (floating ball) column yielded the required monomer which boiled at 64° C. and 40 mm-pressure. Redistillation yielded 493 g (56 percent yield) of polymerizable grade material.

EXAMPLE 6

3-Octoxymethyl-3-methyloxetane (OMMO)

Into a 5 liter, three-neck flask, fitted with a stirrer, reflux condenser, and nitrogen inlet tube, were placed 245 g (2.4 mole) of 3-hydroxymethyl-3-methyloxetane and 3000 ml of P-dioxane. To this solution 47 g (2 mole) of solid sodium metal was added, and the pot temperature was raised to reflux. Heat was maintained until all of the sodium had dissolved. 400 g (2 mole) of 1-bromooctane was added, and the reflux was resumed for 3 days. The mixture was cooled to room temperature, and the solid sodium bromide was filtered off using celite. The solvent was removed by evaporation and the product was distilled at 80° C. and 0.3-mm pressure. Redistillation from calcium hydride gave 231 g of polymerizable monomer, representing a 58 percent yield.

Element analysis calculated: C, 72.8; H, 12.2. Found: C, 72.2; H, 12.6.

NMR(CDCL₃): $\delta 0.86(t,CH_3)$; $1.03(m,(CH_2)_6$; ring CH₃); $3.45(s,t(CH_2OCH_2))$; $4,31, 4.49(AB_q\ CH_2OCH_2)$ J=6.

EXAMPLE 7

Solution Polymerization [e.g., BEMO, BMMO, OMMO/BMMO, BFMO/BEMO, BAMO/BMNO, BNMO/NMMO, etc.]

100 g of calcium hydride-dried methylene chloride is charged into a flame-dried, 500 ml resin flask which is maintained under a nitrogen atmosphere. To this flask is then added the calculated amount of freshly distilled 1,4-butanediol (BDO) followed by the calculated amount of borontrifluoride-etherate (1:2 mole ratio). This solution is allowed to react for 1 hr at room temperature. The reactor is then cooled to −10° C., and after 30 min., a solution of the monomer(s) is added dropwise in methylene chloride (25 percent w/w concentration). The rate of addition usually ranges from 20 min to 2 hr. If the rate of polymerization is unknown, the reaction is followed by gas chromatography (GC) until a conversion of greater than 90 percent is measured. At this time the contents of the flask are quenched with 50 ml of saturated brine solution. The organic phase is separated off, washed with 10-percent sodium bicarbonate solution, dried over magnesium sulfate and evaporated to dryness at room temperature. The nature of the polymer dictates the method of purification. In most cases, a single precipitation from cold methanol yields an acceptable polymer.

EXAMPLE 8

Bulk (neet) Polymerization [e.g., BAMO/THF, BFMO/THF, AMMO/THF, BEMO/THF, BMMO/THF, OMMO/THF, BMEMO/THF, etc.]

Into a 500 ml, flame-dried resin flask, which is maintained under a nitrogen atmosphere, is charged a calculated amount of freshly distilled tetrahydrofuran. While maintaining the flask at room temperature, a calculated amount of freshly distilled 1,4-butanediol is added, followed by a calculated amount of borontrifluoride-etherate. The flask is then cooled to 0° C., and after 60 min., the calculated amount of the second monomer is added in bulk. The rate of addition is governed by the reactivity ratio of the monomer pair, i.e., if the reactivity ratio of the second monomer is significantly different (higher) than that of THF, then the rate of addition is slower. The mole fraction of the second monomer is maintained in the polymerization at a level which will give an apparently idealized copolymerization at the desired monomers-in-polymer composition. If the rate of polymerization is unknown, the polymerization is followed by GC, until a conversion of greater than 90 percent is measured. At this time, the polymerization is quenched, first by the addition of 100 ml of methylene chloride, followed by the addition of 50 ml of saturated brine solution. The organic layer is then separated, washed with a 100 ml sodium bicarbonate solution, dired over magnesium sulfate, and then evaporated to dryness. THF polymers are readily purified by precipitation from cold methanol.

EXAMPLE 9

(BEMO-BMMO/THF)ₙ

BEMO and BMMO/THF blocks were end-capped by preparing the following mixtures:

| BEMO | 105.0 g | BMMO/THF | 70.0 g |
|---|---|---|---|
| TDI | 4.7 ml | TDI | 3.3 ml |
| Ph₂SnCl₂ | 0.51 g | Ph₂SnCl₂ | 0.35 g |
| CH₂Cl₂ | 150 ml | CH₂Cl₂ | 250 ml |

In each case, the polymer was initially dissolved in the methylene chloride, the TDI was mixed in and the catalyst added. After 45 hours at room temperature, BEMO was 82% capped, and BMMO/THF was 89% capped.

The two reaction mixtures were combined. A major portion of the solvent was removed, and 2.3 ml. of butanediol were added. The reaction was warmed to 35°–38° C. After 72 hours, the reaction was essentially complete. The solvent was removed to yield a material that exhibited the characteristics shown in Column A below. An earlier, smaller-scale block polymer has similar characteristics as shown in Column B.

|                         | A       | B       |
|-------------------------|---------|---------|
| Modulus, psi            | 1248    | 1134    |
| Maximum stress, psi     | 135     | 148     |
| Strain at maximum stress, psi | 33 | 40      |
| Shore A hardness        | 64      | 59      |
| $M_w$(GPC)              | 142,000 | 100,000 |
| $M_n$(GPC)              | 13,000  | 12,700  |
| $M_p$(GPC)              | 24,700  | 25,000  |

Due to the difficulties in obtaining a tensile sample free of voids and the inherent limitations of the method, it is felt that differences in mechanical properties between the batches are negligible.

EXAMPLE 10

$(BEMO-BMMO/THF)_n$ preparations A and B of Example 9 were used to prepare propellant grains. In each case, the propellant comprised 22 wt % polymer and 78% of RDX. The RDX used was a 5:2 weight ratio of 5 micron and 2 micron particles. Where plasticizer was used, it was used at a level of 10% of the thermoplastic binder ratio or 2% of the propellant mixture. The properties of these binders are given in Tables I and II below. Abbreviations used in these tables are as follows:

DSC = differential scanning calorimetry
$T_g$ = glass transition temperature
TEGDN = triethylene glycol dinitrate
$M_w$ = molecular weight, weight average
$M_n$ = molecular weight, number average
$M_p$ = molecular weight, peak
EOM torque = end of mix viscosity

TABLE I

| TPE Batch | B | A | A TMETN |
|---|---|---|---|
| Rheocord Test | LT-021 | LT-022 | LT-023 |
| 78% RDX peak torque, m-g | 2000 | 1216 | 620 |
| 111° C. bath temp, °C. | 126 | 118 | 113 |
| EOM torque, m-g | 534 | 334 | 170 |
| Temp, °C. | 118 | 117 | 112 |
| Extrusion | 870226-2 | 870325-1 | 870325-2 |
| 600 psi barrel temp, °C. | 77 | 74–83 | 75–84 |
| Die temp, °C. | 70 | 59–76 | 70–76 |
| T, °C. | 7 | 15–7 | 5–8 |
| DSC, 10° C./min $T_g$, °C. | −23 | — | — |
| $N_2$ flow $T_m$ | +78 | +68 | +67 |
| 63° C. slump compressibility, % | 3.1 | 1.98 | 2.68 |
| 60-min creep, % | 1.4 | 0.9 | 3.19 |
| DMA, 5° C./min $T_g$, °C. | −31 | −34 | −39 |
| Flexural storage modulus, MPa | | | |
| E' at −40° C. | 562 | 552 | 499 |
| 0° | 228 | 193 | 173 |
| +25° | 96 | 88 | 61.8 |
| +40° | 31 | 34.6 | 16.4 |
| at 25° C., psi | 14,000 | 12,700 | 8,150 |
| Tensile Properties at 25° C. | | | |
| Stress, psi | 316 | 309 | 180 |
| Strain, % | 2.7 | 3.1 | 1.4 |
| Modulus, psi | 29,000 | 20,000 | 16,300 |
| Burn rate, at 11,000 psi, in/sec | 0.77 | 0.81 | 0.88 |
| 26,000 psi, in/sec | 2.22 | 2.33 | 2.56 |

TABLE II

| Property | A | A TMETN | A BTTN | A TEGDN |
|---|---|---|---|---|
| Melt viscosity, 1 rpm, 100° C. (cps) | 92,000 | 23,000 | — | — |
| DSC 10° C./min, $N_2$ flow (°C.) | | | | |
| $T_g$ | −44 | −45 | −41 | −45 |
| $T_m$ | +66 | +68 | +68 | +66 |
| $T_d$ | 406 | 196 exo | 201 exo | 207 exo |
|  |  | 411 endo | 411 endo | 420 endo |
| MW, hard block | 7000 | | | |
| MW, soft block | 6700 | | | |
| % hard block | 58.9 | | | |
| GPC, | | | | |
| $M_w$ | 142,000 | | | |
| $M_n$ | 13,000 | | | |
| $M_p$ | 24,700 | | | |
| Stress, psi | 135 | | | |
| Strain at max stress, % | 33 | | | |
| Strain at failure, % | 60 | | | |
| Modulus, psi | 1248 | | | |
| Shore A hardness | 64 | | | |

EXAMPLE 11

Several batches of block polymers were prepared in accordance with the present invention, including $(BEMO-BMMO/THF)_n$, $(BEMO-BAMO/AMMO)_n$, $(BEMO-NMMO)_n$, and $(BEMO-BAMO/NMMO)_n$ polymers. The properties are compared below to those of purported $(BEMO-BMMO/THF)_n$ polymers prepared by phosgene linking as described in U.S. patent application Ser. No. 06/925,660.

TABLE III

COMPARISON OF MATERIALS PREPARED BY VARIOUS METHODS

| Hard Blck | M.W. | Soft Blck | M.W. | % Hard Blck | Mw (K) | Mn (K) | Mp (K) | MOD psi | Strain Max % | Strain Fail % | Stress psi | Stress C-psi | Shore A |
|---|---|---|---|---|---|---|---|---|---|---|---|---|---|
| Isocyanate Linked Materials | | | | | | | | | | | | | |
| BEMO | 7000 | 56BMMO/44THF | 6600 | 51.5 | 209 | 13.1 | 21.5 | 732 | 31 | 51 | 9 | 122 | 44 |
| BEMO | 7000 | 53BMMO/47THF | 7400 | 48.6 | 183 | 14.7 | 23.7 | 811 | 24 | 44 | 3 | 121 | 40 |
| BEMO | 7000 | 57BMMO/43THF | 7400 | 48.6 | 410 | 16.6 | 28.4 | 864 | 33 | 93 | 118 | 183 | 44 |
| BEMO | 7000 | 55BMMO/45THF | 11000 | 38.9 | 143 | 17.2 | 29.5 | 611 | 28 | 89 | 63 | 102 | 32 |
| BEMO | 7000 | 54BMMO/46THF | 6700 | 32.9 | 75 | 15.9 | 30.7 | 249 | 57 | 114 | 35 | 64 | 20 |
| BEMO | 7000 | 55BMMO/45THF | 11000 | 38.9 | 212 | 21 | 76.5 | 270 | 125 | 215 | 48 | 124 | 26 |
| BEMO | 7000 | 55BMMO/45THF | 11000 | 38.9 | 92 | 16.9 | 72.0 | 424 | 34 | 85 | 43 | 65 | 30 |
| BEMO | 7000 | 54BMMO/46THF | 6700 | 51.1 | 172 | 16.8 | 40.0 | 657 | 260 | 336 | 89 | 355 | 45 |
| BEMO | 7000 | 54BMMO/46THF | 6700 | 58.9 | 100 | 12.8 | 25.0 | 1134 | 40 | 170 | 148 | 336 | 59 |
| BEMO | 7000 | 56BAMO/44AMMO | 9900 | 41.4 | | | | 35 | 653 | 705 | 33 | 250 | — |
| BEMO | 5600 | NMMO | 8850 | 44.2 | 37 | 10.7 | 20.9 | 466 | 19 | 22 | 22 | 26 | 9 |
| BEMO | 12800 | 45BAMO/55NMMO | 6211 | 50.0 | 51 | 14.5 | 27.6 | 1111 | 15 | 20 | 91 | 105 | 46 |
| Phosgene Linked Materials | | | | | | | | | | | | | |
| BEMO | 10200 | BMMO/THF | 7600 | 57.3 | 19 | 9.8 | — | 4620 | 4 | 4 | 122 | — | 59 |
| BEMO | 10400 | BMMO/THF | 13200 | 44.1 | 24 | 9.5 | — | 6420 | 10 | 15 | 279 | — | 71 |

TABLE III-continued

| COMPARISON OF MATERIALS PREPARED BY VARIOUS METHODS | | | | | | | | | | | | |
|---|---|---|---|---|---|---|---|---|---|---|---|---|
| Hard Blck | M.W. | Soft Blck | M.W. | % Hard Blck | Mw (K) | Mn (K) | Mp (K) | MOD psi | Strain Max % | Strain Fail % | Stress psi | Stress C-psi | Shore A |
| BEMO | 7700 | BMMO/THF | 15500 | 33.2 | 20 | 11.0 | — | 12440 | 3 | 3 | 308 | — | 87 |
| BEMO | 990 | BMMO/THF | 15500 | 39.0 | 25 | 12.2 | — | 4040 | 12 | 570 | 570 | — | 78 |

Clearly, the properties are substantially different. It is believed that the earlier-described phosgene linking method achieves far less linking than was earlier believed to occur.

While the invention has been described in terms of certain preferred embodiments, modifications obvious to one with ordinary skill in the art may be made without departing from the scope of the present invention.

Various features of the invention are set forth in the following claims.

What is claimed:

1. A method of preparing a thermoplastic elastomer having A blocks and at least one B block, wherein said A blocks are crystalline at temperatures below about 60° C. and said B block(s) is amorphous at temperatures above about −20° C., said A blocks each being polyethers derived from monomers of oxetane and its derivatives and/or tetrahydrofuran and its derivatives, the method comprising providing hydroxyl terminated A blocks which are crystalline at temperatures below about 60° C. and separately providing hydroxyl terminated B blocks which are amorphous at temperatures above about −20° C., end-capping said A blocks and said B blocks by separately reacting each of said A blocks and B blocks with a diisocyanate in which one isocyanate moiety is at least about five times as reactive with the terminal hydroxyl groups of each of the blocks as the other isocyanate moiety, whereby the more reactive isocyanate moiety tends to react with terminal hydroxyl groups of the blocks, leaving the less reactive isocyanate moiety free and unreacted, mixing said end-capped A blocks and said end-capped B blocks together at approximately the stoichiometric ratios that they are intended to be present in the thermoplastic elastomer, and reacting said mixture with a linking compound having two isocyanate-reactive groups which are sufficiently unhindered to react with the free isocyanate groups of said end-capped polymer.

2. The method according to claim 1 wherein said oxetane momomers have the general formula:

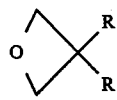

wherein the R groups are the same or different and are selected from moieties having the general formulae: —(CH$_2$)$_n$X, where n is 0–10 and X is selected from the group consisting of —H, —NO$_2$, —CN, —Cl, F, —O-alkyl, —OH, —I, —ONO$_2$, —N(NO$_2$)-alkyl, —C≡CH, —Br, —CH=CH(H or alkyl), —O—CO—(H or alkyl), —CO$_2$—(H or alkyl), —N(H or alkyl)$_2$, —O—(CH$_2$)$_{1-5}$—O—(CH$_2$)$_{0-8}$—CH$_3$, and —N$_3$.

3. A method according to claim 1 wherein said THF monomers have the general formula:

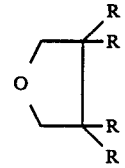

wherein the R groups are the same or different and are selected from moieties having the general formulae: —(CH$_2$)$_n$X, where n is 0–10 and X is selected from the group consisting of —H, —NO$_2$, —CN, —Cl, F, —O—alkyl, —OH, —I, —ONO$_2$, —N(NO$_2$)-alkyl, —C≡CH, —Br, —CH=CH(H or alkyl), —O—CO—(H or alkyl), —CO$_2$—(H or alkyl), —N(H or alkyl)$_2$, —O—(CH$_2$)$_{1-5}$—O—(CH$_2$)$_{0-8}$—CH$_3$, and —N$_3$.

4. A method according to claim 1 wherein said B block(s) has a molecular weight of between about 5000 and about 50,000 and each of said A blocks has a molecular weight of between about 3000 and about 12,500.

5. A method according to claim 1 wherein said A blocks together have a molecular weight between about ½ and about 1 times the molecular weight of said B block or total weight of said B blocks.

6. A method according to claim 1 wherein said A block is selected from the group consisting of poly(3,3-bis(ethoxymethyl)oxetane), poly(3,3-bis(methoxymethyl)oxetane), poly(3,3-bis(fluromethyl)oxetane), and poly(3,3-bis(azidomethyl)oxetane).

7. A method according to claim 1 wherein said B block is selected from poly(3-azidomethyl-3-methyloxetane, (3-azidomethyl-3-methyloxetane)/3,3-bis(azidomethyl)oxetane copolymer, tetrahydrofuran/3,3-bis(azidomethyl)oxetane copolymer, tetrahydrofuran/3-azidomethyl-3-methyloxetane copolymer, tetrahydrofuran/3-octoxymethyl-3-methyloxetane copolymer, tetrahydrofuran/3,3-bis(methyoxyethoxymethyl)oxetane copolymer, tetrahydrofuran/3,3-bis(ethoxymethyl)oxetane copolymer, tetrahydrofuran/3,3-bis(methoxymethyl)oxetane copolymer, tetrahydrofuran/3,3-bis(fluromethyl)oxetane copolymer, poly(3-nitratomethyl-3-methyloxetane), and 3,3-bis-(azidomethyl)oxetane/3-nitratomethyl-3-methyloxetane)coploymer.

8. A method according to claim 1 wherein said oxetane monomers are selected from the group consisting of:

3,3-bis(ethoxymethyl)oxetane, 3,3-bis(chloromethyl)oxetane,
3,3-bis(methoxymethyl)oxetane, 3,3-bis(fluromethyl)oxetane,
3-hydroxymethyl-3-methyloxetane,
3,3-bis(acetoxymethyl)oxetane, 3,3-bis(hydroxymethyl)oxetane,
3-octoxymethyl-3-methyloxetane,
3,3-bis(methoxyethoxymethyl)oxetane, 3-chloromethyl-3-methyloxetane, 3-azidomethyl-3-methyloxetane,
3-3-bis(iodomethyl)oxetane, 3-iodomethyl-3-methyloxetane,
3-propynomethylmethyloxetane, 3,3-bis(nitratomethyl)oxetane,
3-nitratomethyl-3-methyloxetane,
3,3-bis(methylnitraminomethyl)oxetane,
3-methylnitraminomethyl-3-methyloxetane, and
3,3-bis(azidomethyl)oxetane.

9. The product of the process of claim 1.

10. (3,3-bis(ethoxymethyl)oxetanetetrahydrofuran/3,3-bis(methoxymethyl)oxetane)$_n$ produced according to the method of claim 1.

11. (3,3-bis(ethoxymethyl)oxetane-3,3-bis(azidomethyl)oxetane/3-azidomethyl-3-methyloxetane)$_n$ prepared according to the method of claim 1.

12. A method according to claim 1 wherein said diisocyanate is toluene diisocyanate.

13. A method according to claim 1 wherein said diisocyanate is isophorone diisocyanate.

14. A method according to claim 1 wherein said end-capping reaction and said reaction with said linking compound are each conducted in the presence of a urethane catalyst.

15. A method according to claim 1 wherein each of said A blocks and said B blocks are difunctional and said linking compound is provided at about a 0.4 to 0.6 molar ratio relative to total A and B blocks, whereby an (AB)$_n$ polymer is produced.

16. A method according to claim 1 wherein in said end-capping reaction, when either of said blocks has a pair of terminal hydroxyl groups, said diisocyanate is provided at between about a 1.75 and about a 2.2 molar ratio.

* * * * *